(12) United States Patent
Nakada

(10) Patent No.: US 9,962,002 B2
(45) Date of Patent: May 8, 2018

(54) CUSHION PAD

(71) Applicant: TOYO TIRE & RUBBER CO., LTD., Osaka-shi, Osaka (JP)

(72) Inventor: Toru Nakada, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 85 days.

(21) Appl. No.: 14/885,697

(22) Filed: Oct. 16, 2015

(65) Prior Publication Data

US 2016/0143442 A1    May 26, 2016

(30) Foreign Application Priority Data

Nov. 25, 2014  (JP) ................................. 2014-237433

(51) Int. Cl.

| A47C 7/24 | (2006.01) |
|---|---|
| A47C 7/18 | (2006.01) |
| B64D 11/06 | (2006.01) |
| B61D 33/00 | (2006.01) |
| B60N 2/70 | (2006.01) |
| B60N 2/42 | (2006.01) |

(52) U.S. Cl.
CPC .................. *A47C 7/24* (2013.01); *A47C 7/18* (2013.01); *B60N 2/4263* (2013.01); *B60N 2/70* (2013.01); *B60N 2/7017* (2013.01); *B61D 33/0035* (2013.01); *B64D 11/0647* (2014.12)

(58) Field of Classification Search
None
See application file for complete search history.

(56) References Cited

U.S. PATENT DOCUMENTS

| 4,522,447 A | * | 6/1985 | Snyder | ................... | A47C 7/022 |
| | | | | | 297/452.27 |
| 4,571,319 A | * | 2/1986 | Baluch | ................ | B01F 15/0404 |
| | | | | | 264/255 |
| 4,837,881 A | * | 6/1989 | Kondo | ..................... | A47C 7/18 |
| | | | | | 297/452.27 |

(Continued)

FOREIGN PATENT DOCUMENTS

JP    2006-122504 A    5/2006

OTHER PUBLICATIONS

Office Action dated Feb. 5, 2018, issued in counterpart Chinese Application No. 201510672604.5, with English translation. (11 pages).

*Primary Examiner* — David E Allred
(74) *Attorney, Agent, or Firm* — Westerman, Hattori, Daniels & Adrian, LLP

(57) ABSTRACT

[Problem]
To provide a cushion pad that allows reducing the oppressive feeling in a thigh and the sinking of buttocks and improving the texture and the fit feeling.
[Solution]
In a portion positioned underneath a hip point of a seated person, an under-buttock portion is set to have a smaller force $S_{25}$ during compression to 25% in a second portion including a seating surface than $S_{25}$ of the first portion positioned on a bottom surface side. The thigh supporting portion is set to have smaller $S_{25}$ of a portion including the seating surface than $S_{25}$ of the first portion. This allows reducing the oppressive feeling in the thigh and the sinking of the buttocks and improving the texture and the fit feeling.

8 Claims, 9 Drawing Sheets

(56) References Cited

U.S. PATENT DOCUMENTS

| | | | | |
|---|---|---|---|---|
| 4,965,029 | A * | 10/1990 | Lidy | A47C 7/18 |
| | | | | 264/45.1 |
| 7,614,704 | B2 * | 11/2009 | Whelan | A47C 7/021 |
| | | | | 297/452.25 |
| 9,266,455 | B2 * | 2/2016 | Uramichi | B60N 2/70 |
| 9,604,549 | B2 * | 3/2017 | Makiguchi | B60N 2/02 |
| 2003/0186044 | A1 * | 10/2003 | Sauniere | A47C 7/185 |
| | | | | 428/315.7 |
| 2006/0273650 | A1 * | 12/2006 | Embach | B60N 2/70 |
| | | | | 297/452.27 |
| 2013/0125313 | A1 * | 5/2013 | Yamasaki | A47C 7/021 |
| | | | | 5/653 |
| 2016/0023584 | A1 * | 1/2016 | Nakada | A47C 27/148 |
| | | | | 297/452.48 |
| 2016/0039322 | A1 * | 2/2016 | Nakada | B60N 2/646 |
| | | | | 297/452.48 |

\* cited by examiner

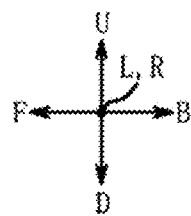
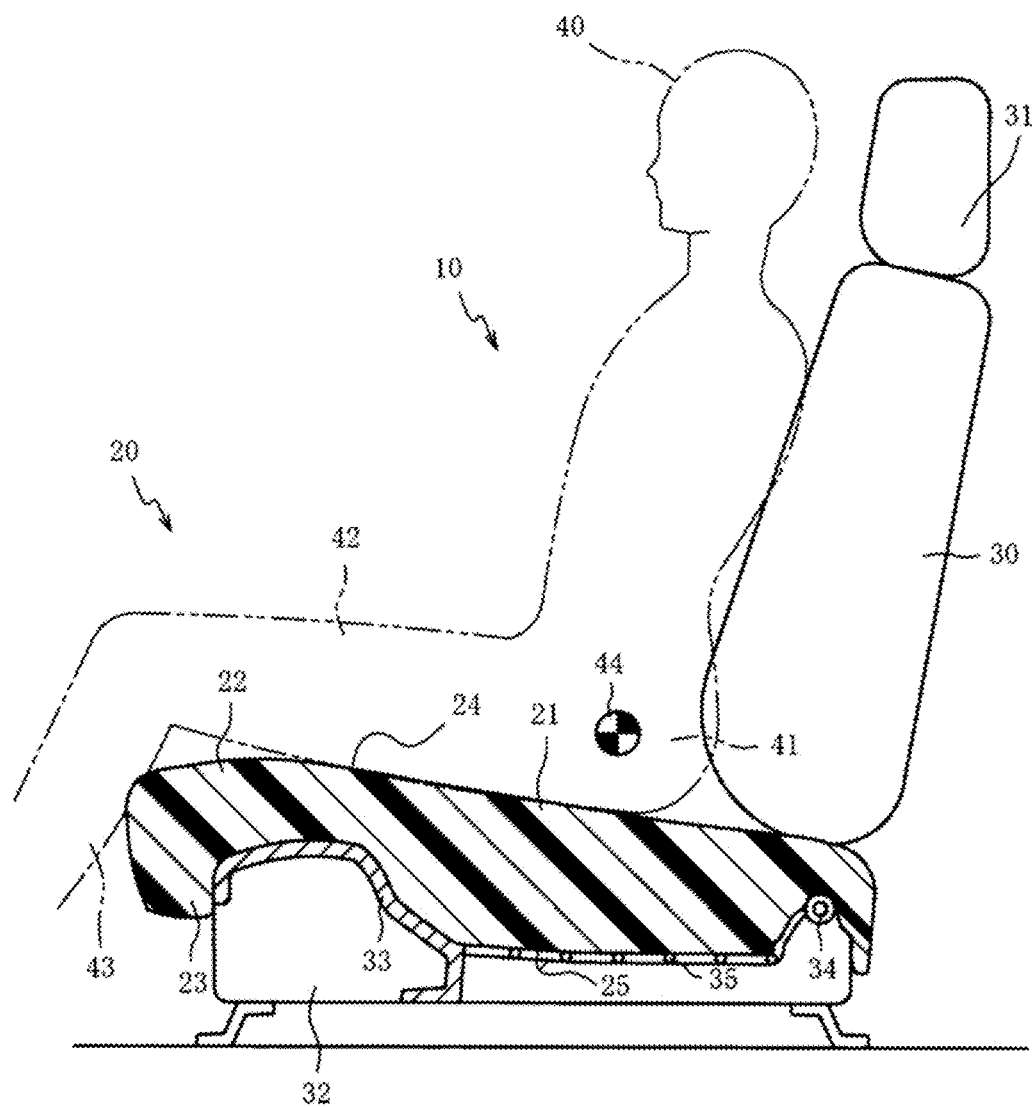
FIG. 1

CUSHION PAD

TECHNICAL FIELD

The present invention relates to a cushion pad, particularly, to a cushion pad that reduces an oppressive feeling in a thigh and sinking of buttocks.

BACKGROUND ART

A cushion pad used for, for example, a seat and a chair such as furniture equipped with transportation means such as a vehicle, a ship, and an aircraft includes: a thigh supporting portion, which supports the thigh of a seated person; and an under-buttock portion, which supports the buttocks of the seated person and receives a large load compared with the thigh supporting portion. When the hardness of the thigh supporting portion is set corresponding to the hardness of the under-buttock portion in the cushion pad, the thigh feels numbness, an oppressive feeling, a foreign-body feeling, and a resistance feeling (hereinafter, these are referred to simply as an "oppressive feeling"). On the other hand, when the hardness of the under-buttock portion is set corresponding to the hardness of the thigh supporting portion, the sinking of the buttocks becomes large so as to cause an unstable seating posture. Therefore, there is a technique that sets the hardness of the base material of the thigh supporting portion corresponding to the hardness of the under-buttock portion and implants a foamed body having a strength smaller than that of the under-buttock portion in the base material of the thigh supporting portion (in Patent Literature 1). As a result, the thigh supporting portion can be softened so as to reduce the oppressive feeling in the thigh.

CITATION LIST

Patent Literature

[Patent Literature 1] JP-A No. 2006-122504

SUMMARY OF INVENTION

Technical Problem

However, the above-described technique has a problem where the hard under-buttock portion deteriorates the texture and the fit feeling of the under-buttock portion.

The present invention has been made to address to the above-described problem, and it is an object of the present invention to provide a cushion pad that allows reducing the oppressive feeling in the thigh and the sinking of the buttocks and improving the texture and the fit feeling.

Solution to Problem and Advantageous Effects of Invention

To achieve this object, with the cushion pad according to claim 1, buttocks of a seated person is supported by an under-buttock portion, and a thigh of the seated person is supported by a thigh supporting portion positioned forward of the under-buttock portion. The under-buttock portion and the thigh supporting portion have seating surfaces facing the seated person and bottom surfaces on an opposite side to the seating surfaces. In a portion positioned underneath a hip point of the seated person, the under-buttock portion is set to have a smaller hardness of a second portion including the seating surface than a hardness of a first portion on the bottom surface side of a thickness center. The thickness center is a center sandwiched between the seating surface and the bottom surface in the thickness direction. The hardness is a force during compression to 25% measured in compliance with E method specified in JIS K6400-2 (the 2012 edition) using a quadratic-prism-shaped test piece sampled by equally dividing the under-buttock portion and the thigh supporting portion. This allows reducing the sinking of the buttocks and improving the texture and the fit feeling. The thigh supporting portion is set to have a smaller hardness of a portion including the seating surface than the hardness of the first portion. This allows reducing the oppressive feeling in the thigh. Thus, this provides an effect that allows reducing the oppressive feeling in the thigh and the sinking of the buttocks and improving the texture and the fit feeling.

With the cushion pad according to claim 2, the under-buttock portion is set to have a larger hardness of a third portion than the hardness of the first portion. The third portion has a depth identical to a depth of the first portion from the seating surface. The third portion is positioned rearward of the hip point. Accordingly, in addition to the effect of claim 1, this provides an effect that allows improving the feeling of stability of the buttocks supported by the under-buttock portion.

With the cushion pad according to claim 3, the under-buttock portion is set to have a larger hardness of a fourth portion than the hardness of the first portion. The fourth portion has a depth identical to a depth of the first portion from the seating surface. The fourth portion is positioned forward of the hip point. Accordingly, in addition to the effect of claim 1, this provides an effect that allows reducing the occurrence of the phenomenon (what is called a submarine phenomenon) where the seated person has a posture under the cushion pad during a frontal collision or during braking of transportation means in the case where the cushion pad is mounted on the transportation means.

With the cushion pad according to claim 4, the thigh supporting portion is set to have a larger hardness of a portion on the bottom surface side than the hardness of the portion including the seating surface. Accordingly, in addition to the effect of claim 1, this provides an effect that allows improving the feeling of stability of the thigh.

With the cushion pad according to claim 5, the thigh supporting portion includes a forward end portion where the seating surface faces a lower thigh of the seated person. The forward end portion is set to have a larger hardness of a portion on the bottom surface side than a hardness of a portion including the seating surface. Accordingly, in addition to the effect of claim 1, this provides an effect that allows improving the soft feeling of the seating surface in contact with the lower thigh.

With the cushion pad according to claim 6, the under-buttock portion and the thigh supporting portion are integrally molded by a single foamed synthetic resin material. The forward end portion is formed by being bent after the under-buttock portion and the thigh supporting portion are molded. This allows eliminating the processes for burying insert materials having different hardnesses and for laminating a plurality of layers having different hardnesses in the manufacturing process of the cushion pad. Accordingly, in addition to the effect of claim 5, this provides an effect that allows saving the manufacturing cost of the cushion pad.

BRIEF DESCRIPTION OF DRAWINGS

FIG. 1 is a partial cross-sectional view illustrating a partial cross section of a seat on which a cushion pad is mounted according to a first embodiment of the present invention.

DESCRIPTION OF EMBODIMENTS

Figure 2:
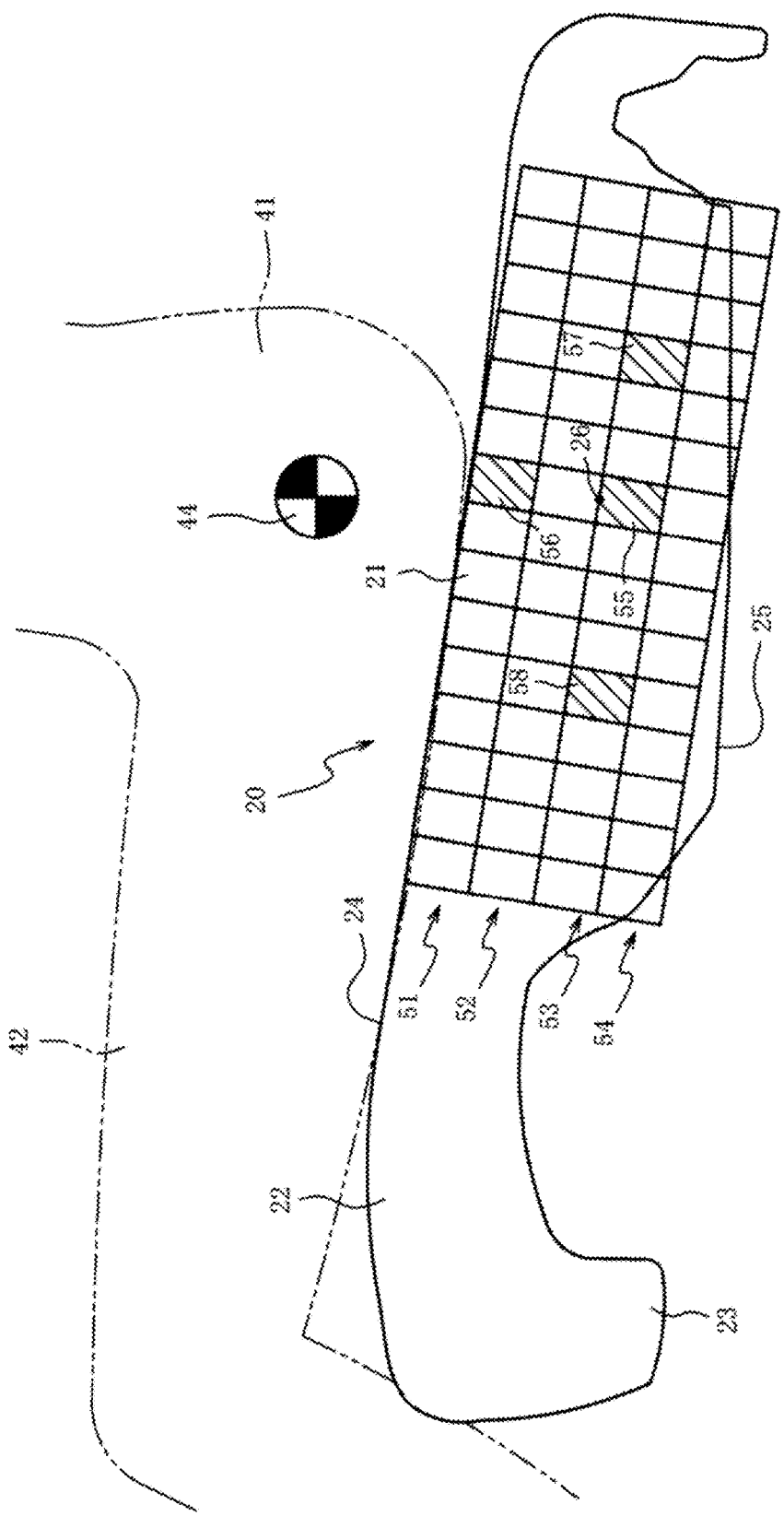
FIG. 2 is a schematic diagram where test pieces obtained by equally dividing an under-buttock portion are overlapped with a cross-sectional view of the cushion pad.

Hereinafter, a description will be given of preferred embodiments of the present invention with reference to the accompanying drawings. FIG. 1 is a partial cross-sectional view illustrating a partial cross section of a seat 10 on which a cushion pad 20 is mounted according to a first embodiment of the present invention. Note that, the respective arrows U-D, L-R, and F-B in FIG. 1 denote the above-below direction, the right-left direction, and the front-rear direction of a vehicle (not shown) on which the seat 10 is mounted.

As illustrated in FIG. 1, the seat 10 includes: the cushion pad 20 (seat cushion); a seat back 30, which is tiltably coupled to the rear end portion of the seat cushion; and a head rest 31, which is coupled to the upper end portion of the seat back 30. The cushion pad 20 is the base material of the seat cushion on which a seated person 40 is seated, and is constituted by a foamed body such as flexible polyurethane foam. Note that, in FIG. 1, the illustration of the surface skin covering the cushion pad 20, the illustration of the reinforced fabric intervening between the cushion pad 20 and a seat frame 32, and the illustration of the side support portion facing the side surface of the seated person 40 are omitted.

The cushion pad 20 includes: an under-buttock portion 21, which is positioned underneath a hip point 44 of the seated person 40 to support buttocks 41; and a thigh supporting portion 22, which is continuous with the front portion of the under-buttock portion 21 and supports a thigh 42 of the seated person 40. The thigh supporting portion 22 includes a forward end portion 23, which faces a lower thigh (calf) 43 of the seated person 40. Note that, the hip point 44 is a point H (the hip point, the point corresponding to the hip joint) of a three-dimensional mannequin (human phantom) specified by JIS D4607 or JIS D0024 (ISO 6549) in the case where the three-dimensional mannequin is seated on the seat 10.

In the cushion pad 20, a bottom surface 25 on the opposite side to a seating surface 24, which faces the seated person 40, is supported by the seat frame 32. In the seat frame 32, a front frame 33 and a rear frame 34 are bridged in the right-left direction (the L-R direction in FIG. 1), and a cushion spring 35 is bridged between the front frame 33 and the rear frame 34. In the cushion pad 20, the rear end portion of the under-buttock portion 21 is supported by the rear frame 34 from the lower side, and the thigh supporting portion 22 is supported by the front frame 33 from the lower side. The central portion in the front-rear direction of the under-buttock portion 21 is supported by the cushion spring 35 from the lower side. The front face of the front frame 33 is covered with the forward end portion 23.

The cushion pad 20 has a feature in the hardness distributions in the above-below direction (the arrow U-D direction) and the right-left direction (the arrow L-R direction) of the under-buttock portion 21 and the thigh supporting portion 22. In this embodiment, small test pieces sampled from the under-buttock portion 21 and the thigh supporting portion 22 (both of which are molded object) are used to measure the hardness so as to obtain the hardness distribution. Firstly, referring to FIG. 2, the sampling positions of the test piece in the under-buttock portion 21 will be described. FIG. 2 is a schematic diagram where the test pieces obtained by equally dividing the under-buttock portion 21 are overlapped with a cross-sectional view (see FIG. 1) of the cushion pad 20. The under-buttock portion 21 is equally divided in the above-below direction (the depth direction) and the front-rear direction to measure the hardness with reference to the seating surface 24, so as to sample a plurality of test pieces.

In this embodiment, the under-buttock portion 21 is equally sectionalized into four layers (20 mm for each thickness) from the seating surface 24 toward the bottom surface 25. Those layers in the front-rear direction (the arrow F-B direction in FIG. 1) are equally sectionalized into 15 pieces (20 mm for each length). In the respective layers, the widths in the width direction (the perpendicular direction on the paper in FIG. 2) are set to 20 mm to sample the test pieces in a quadrangular prism shape (cube) having 20 mm for each side. Note that, the test pieces exclude a test piece (a test piece does not have a predetermined quadrangular prism shape (cube)) that intersects the seating surface 24 or the bottom surface 25 of the under-buttock portion 21 so as to have a partial deficit.

The under-buttock portion 21 is partitioned into four layers overlapping from the seating surface 24 toward the bottom surface 25. These four layers are: a seating portion 51, which includes the seating surface 24; an upper center portion 52, which is positioned under the seating portion 51; a lower center portion 53, which is positioned under the upper center portion 52; and a bottom surface portion 54, which is positioned under the lower center portion 53 and includes the bottom surface 25, and are portions having respective approximately identical depths from the seating surface 24 over the front-rear direction. The seating portion 51 and the upper center portion 52 are positioned on the seating surface 24 side of a thickness center 26, which is the center in the thickness direction of the under-buttock portion 21 in the portion positioned underneath the hip point 44. The lower center portion 53 and the bottom surface portion 54 are positioned on the bottom surface 25 side of the thickness center 26. Note that, the seating portion 51 is formed along the seating surface 24. Accordingly, in the case where the seating surface 24 is a curved surface, the seating portion 51 is formed to be bent along with the seating surface 24. Along with this formation, the upper center portion 52, the lower center portion 53, and the bottom surface portion 54 are also formed to be bent. However, in FIG. 2, the seating portion 51, the upper center portion 52, the lower center portion 53, and the bottom surface portion 54 are illustrated in a straight line for convenience.

For the sampled test piece, the force during compression to 25% is measured in compliance with E method specified in JIS K6400-2 (the 2012 edition). JIS K6400-2 is Japanese Industrial Standards made by based on ISO 2439 (Fourth Edition: issued in 2008), ISO 3386-1 (Second Edition: issued in 1986), and ISO 3386-2 (Second Edition: issued in 1997). According to this testing method, the test piece placed on a support plate (not shown) larger than the test piece while facing the above-below direction (the arrow U-D direction) is pre-compressed by a pressure plate (not shown) having a pressure surface larger than the top surface of the test piece, and then is pressurized to have 75±2.5% of the thickness. The force when the test piece is pressurized to have 25±1% of the thickness is assumed to be a force $S_{25}$ (unit: N) under compression of the test piece to 25%. In this description, the force (hereinafter, referred to as "$S_{25}$") during compression to 25% is defined as "hardness."

It is to be noted that, the test piece sampled from the bottom surface portion 54 is placed on a support plate (not shown) side while facing the bottom surface 25 side after a reinforced fabric (not shown) molded integrally with the bottom surface 25 is removed. Then, the hardness is measured. This is for reducing the influence of the reinforced fabric.

Furthermore, for convenience, the portion (test piece) that is: the portion positioned underneath the hip point 44; and the portion positioned on the bottom surface 25 side of the thickness center 26, is referred to as a first portion 55. The portion (test piece) that is: the portion positioned on the straight line passing through the first portion 55 perpendicularly to the seating surface 24; and the portion including the seating surface 24, is referred to as a second portion 56. In the portion having a depth identical to that of the first portion 55 from the seating surface 24 (the portion within the lower center portion 53), the portion (test piece) positioned rearward of the hip point 44 is referred to as a third portion 57, and the portion (test piece) positioned forward of the hip point 44 is referred to as a fourth portion 58.

Figure 3:
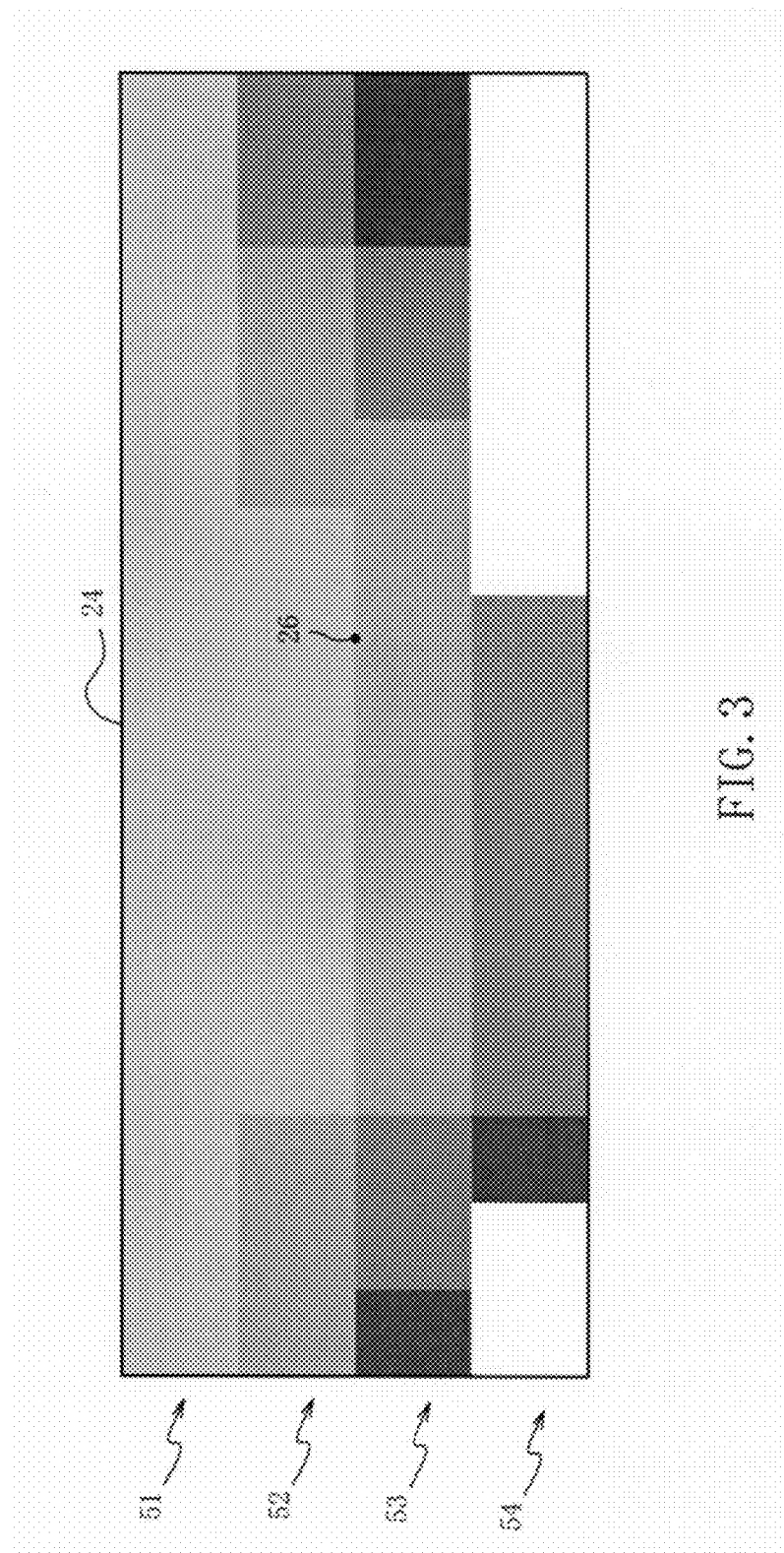
FIG. 3 is a diagram illustrating a hardness distribution of the under-buttock portion.

Referring to FIG. 3, the following describes the hardness distribution of the under-buttock portion 21 based on $S_{25}$ (the measured values) of the respective test pieces. FIG. 3 is a diagram illustrating the hardness distribution of the under-buttock portion 21. Note that, in FIG. 3, the values (unit: N/cm$^2$) obtained by dividing the hardnesses (unit: N) of the respective test pieces by the cross-sectional areas (unit: cm$^2$) of the test pieces are divided into four sections. These sections are displayed by four levels of shadings corresponding to the sampling positions of the test pieces. FIG. 3 illustrates the state where a darker color indicates a larger hardness.

As illustrated in FIG. 3, the under-buttock portion 21 is formed to have a larger hardness in the order corresponding to the seating portion 51, the upper center portion 52, the lower center portion 53, and the bottom surface portion 54. Furthermore, the upper center portion 52, the lower center portion 53, and the bottom surface portion 54 are formed such that the hardness increases toward the outer side (both the right and left sides in FIG. 3) of the center in the front-rear direction. As a result, the under-buttock portion 21 has the hardness increasing from the seating surface 24 toward the bottom surface 25, and has a mortar-shaped hardness distribution where the hardness on the outer side of the center in the front-rear direction increases.

When the seated person 40 (see FIG. 1) is seated on this cushion pad 20 (the under-buttock portion 21), the under-buttock portion 21 is compressed in the above-below direction (the arrow U-D direction in FIG. 1) by the weight of this seated person 40. The under-buttock portion 21 is set to increase in hardness from the seating surface 24 toward the bottom surface 25 (see FIG. 3). This allows providing close contact feeling (fit feeling) with the buttocks 41 while providing soft feeling mainly by the seating portion 51 and the upper center portion 52. Furthermore, the seating portion 51, the upper center portion 52, the lower center portion 53, and the bottom surface portion 54 deform to ensure the holding property (the restraint property) of the buttocks 41 in the front-rear direction (the arrow F-B direction in FIG. 1) so as to stabilize the seating posture.

In particular, the under-buttock portion 21 has the mortar-shaped hardness distribution where the upper center portion 52, the lower center portion 53, and the bottom surface portion 54 have the larger hardnesses on the outer side in the front-rear direction relative to the center in the front-rear direction. This allows improving the holding property of the buttocks 41.

Figure 4:
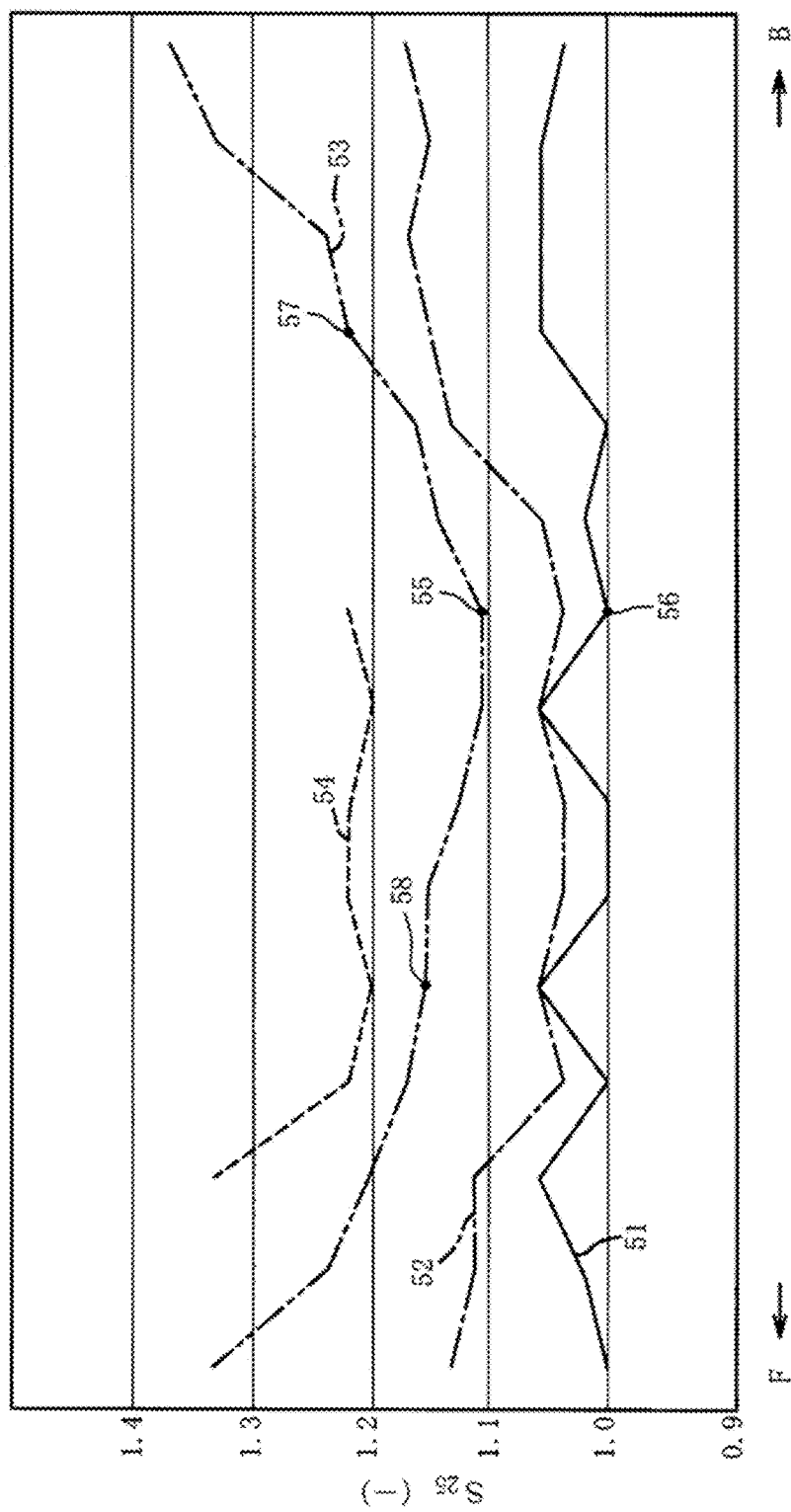
FIG. 4 is a graph illustrating the hardness of the under-buttock portion.

The following the hardness distribution of the cushion pad 20 (the under-buttock portion 21) by referring to FIG. 4 in detail. FIG. 4 is a graph illustrating the hardness of the under-buttock portion 21. In FIG. 4, $S_{25}$ (the ratio of the second portion 56 to the hardness) of the respective test pieces are plotted when the force $S_{25}$ during compression to 25% of the second portion 56 (the portion under the hip point 44 in the seating portion 51) is set to 1. In FIG. 4, the horizontal axis (the X-axis) denotes the sampling positions (where the left side in the drawing is the front side and the right side is the rear side) of the respective test pieces in the front-rear direction in the under-buttock portion 21. The vertical axis (the Y-axis) denotes $S_{25}$ (the ratio). The solid line denotes $S_{25}$ of the respective test pieces in the seating portion 51. The one dot chain line denotes $S_{25}$ of the respective test pieces in the upper center portion 52. The two-dot chain line denotes $S_{25}$ of the respective test pieces in the lower center portion 53. The dashed line denotes $S_{25}$ of the respective test pieces in the bottom surface portion 54. Note that, in FIG. 4, the hardness of the test piece that intersects with the bottom surface 25 of the under-buttock portion 21 so as to have a partial deficit is not plotted.

As illustrated in FIG. 4, the seating portion 51 has an approximately constant hardness over the front-rear direction. In contrast, the upper center portion 52 and the lower center portion 53 have hardness gradients where the hardnesses gradually increase toward the outer side in the front-rear direction. The bottom surface portion 54 has a hardness gradient where the hardness gradually increases toward the front side. Note that, the bottom surface portion 54 shows a trend where the hardness gradually increases toward the rear side, which is not illustrated. Compared with the hardness gradient of the upper center portion 52, the hardness gradients of the lower center portion 53 and the bottom surface portion 54 are set to be large. This allows providing a comfortable holding property to the seated person 40.

The under-buttock portion 21 is set such that the hardness of the second portion 56 including the seating surface 24 is smaller than the hardness of the first portion 55 on the bottom surface 25 side of the thickness center 26 (see FIG. 2). This allows reducing the sinking of the buttocks 41 and improving the texture and the fit feeling in the under-buttock portion 21. The under-buttock portion 21 is set such that the hardness of the third portion 57, which has the depth identical to that of the first portion 55 from the seating surface 24 and is positioned rearward (in the arrow B direction in FIG. 4) of the hip point 44, is larger than the hardness of the first portion 55. This allows improving the feeling of stability in the buttocks 41 supported by the under-buttock portion 21. As a result, the seating posture of the seated person 40 can be stabilized.

Additionally, the under-buttock portion 21 is set such that the hardness of the fourth portion 58, which has the depth identical to that of the first portion 55 from the seating surface 24 and is positioned forward (in the arrow F direction in FIG. 4) of the hip point 44, is larger than the hardness of the first portion 55. This consequently allows reducing, in cooperation with the front frame 33 (see FIG. 1), the occurrence of the phenomenon (what is called a submarine phenomenon) where the seated person 40 has a posture under the cushion pad 20 during a frontal collision, during a frontal impact, or during braking of the transportation means in the case where the cushion pad 20 is mounted on the seat 10 of the transportation means.

The hardnesses in the respective portions positioned on the straight line passing through the first portion 55 and the second portion 56 (on the straight line perpendicular to the seating surface 24) gradually increase in the order corresponding to the seating portion 51 (the upper center portion 52), the lower center portion 53, and the bottom surface portion 54. This consequently allows obtaining the soft feeling during seating on the seating surface 24 side and reducing sinking of the buttocks 41 on the bottom surface 25 side.

Furthermore, the hardnesses in the respective portions positioned on the respective straight lines passing through the third portion 57 and the fourth portion 58 (on the straight lines perpendicular to the seating surface 24) gradually increase in the order corresponding to the seating portion 51 (the upper center portion 52), the lower center portion 53, and the bottom surface portion 54 (the portion for the third portion 57 is not illustrated). This consequently allows obtaining the soft feeling during seating on the seating surface 24 side and improving the holding property of the buttocks 41 on the bottom surface 25 side. Furthermore, the stabilization of the seating posture can be improved by reducing the occurrence of the submarine phenomenon and improving the feeling of stability of the buttocks 41.

Note that, the hardnesses of the respective test pieces in the lower center portion 53 including the first portion 55 gradually increase from the first portion 55 toward the outer side in the front-rear direction. This consequently allows ensuring holding property of the buttocks 41 of the seated person 40 on the bottom surface 25 side (the lower center portion 53) of the under-buttock portion 21 so as to reduce the wobbling feeling generated in the front-rear direction during acceleration and deceleration.

Figure 5:
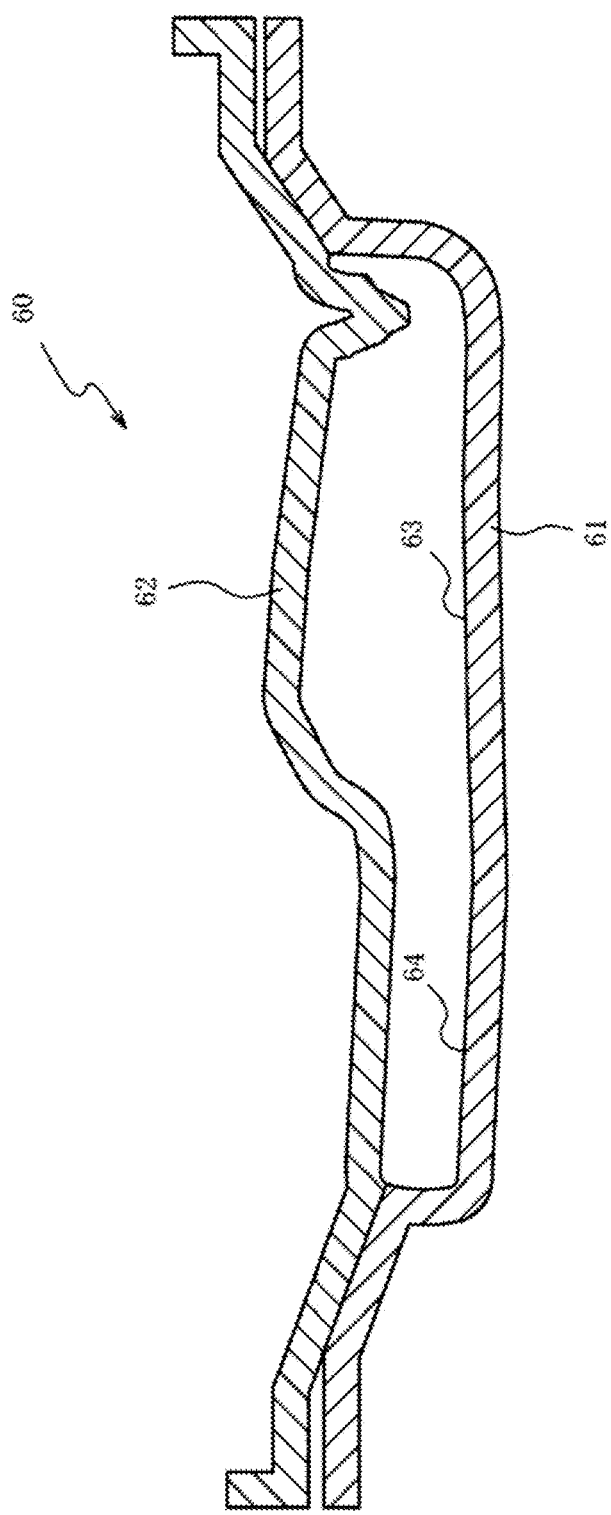
FIG. 5 is a cross-sectional view of a molding die for molding the cushion pad.

The following describes a method for manufacturing the cushion pad 20 with reference to FIG. 5. FIG. 5 is a cross-sectional view of a molding die 60 for molding the cushion pad 20. The cushion pad 20 is manufactured by injecting a compound liquid (foamable raw liquid) containing a polyol component, a polyisocyanate component, a foaming agent, and a catalyst to the molding die 60 (a lower die 61) and foam molding inside the molding die 60 (the lower die 61 and an upper die 62). The molding die 60 includes: a first cavity 63 for molding the under-buttock portion 21; and a second cavity 64 for molding the thigh supporting portion 22 (see FIG. 1). The seating surface 24 is molded by the lower die 61 of the molding die 60, and the bottom surface 25 is molded by the upper die 62. The under-buttock portion 21 and the thigh supporting portion 22 are integrally molded by the single foamed synthetic resin material. This allows eliminating the processes for burying an insert material having a large hardness and for laminating a plurality of layers having different hardnesses in the manufacturing process of the cushion pad 20. This allows saving the manufacturing cost of the cushion pad 20.

It is to be noted that the cushion pad 20 can be molded integrally with the bottom surface 25 by preliminarily attaching a reinforced fabric such as coarse wool cloth and nonwoven fabric on the molding die 60 (the upper die 62). Furthermore, after the cushion pad 20 is molded, a reinforced fabric can be bonded to the bottom surface 25.

In the cushion pad 20, the thigh supporting portion 22 is installed on the front frame 33 (see FIG. 1). The forward end portion 23 is arranged on the front face of the seat frame 32 while being bent downward. However, as illustrated in FIG. 5, the second cavity 64 of the molding die 60 for molding the thigh supporting portion 22 does not include a bent portion formed corresponding to the shape of the forward end portion 23, but is formed in a straight line. This molding die 60 is used for molding the thigh supporting portion 22 in a mat shape (flat plate shape).

Figure 6:
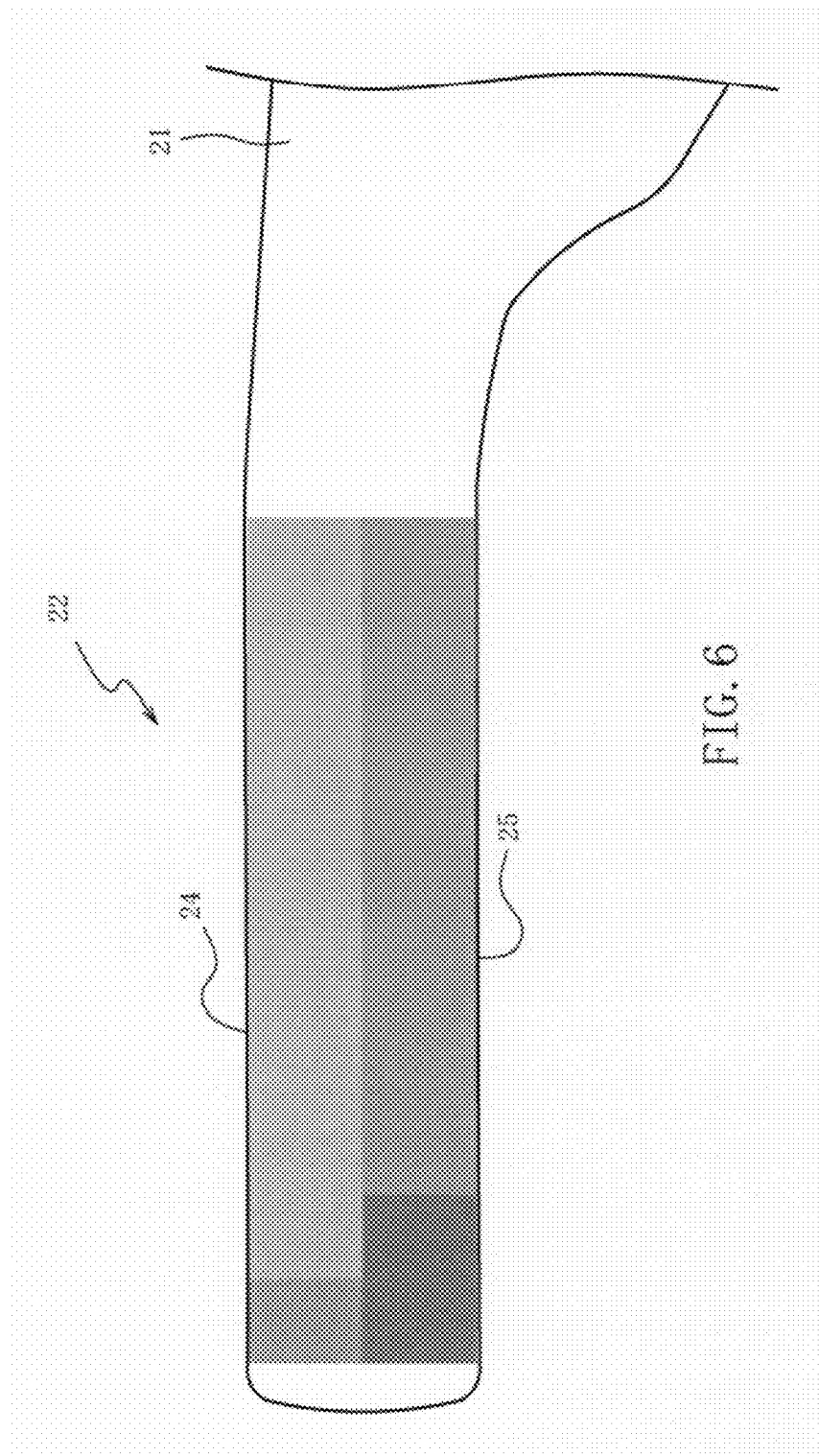
FIG. 6 is a partial cross-sectional view illustrating a partial cross section of a thigh supporting portion before bending.
Figure 7:
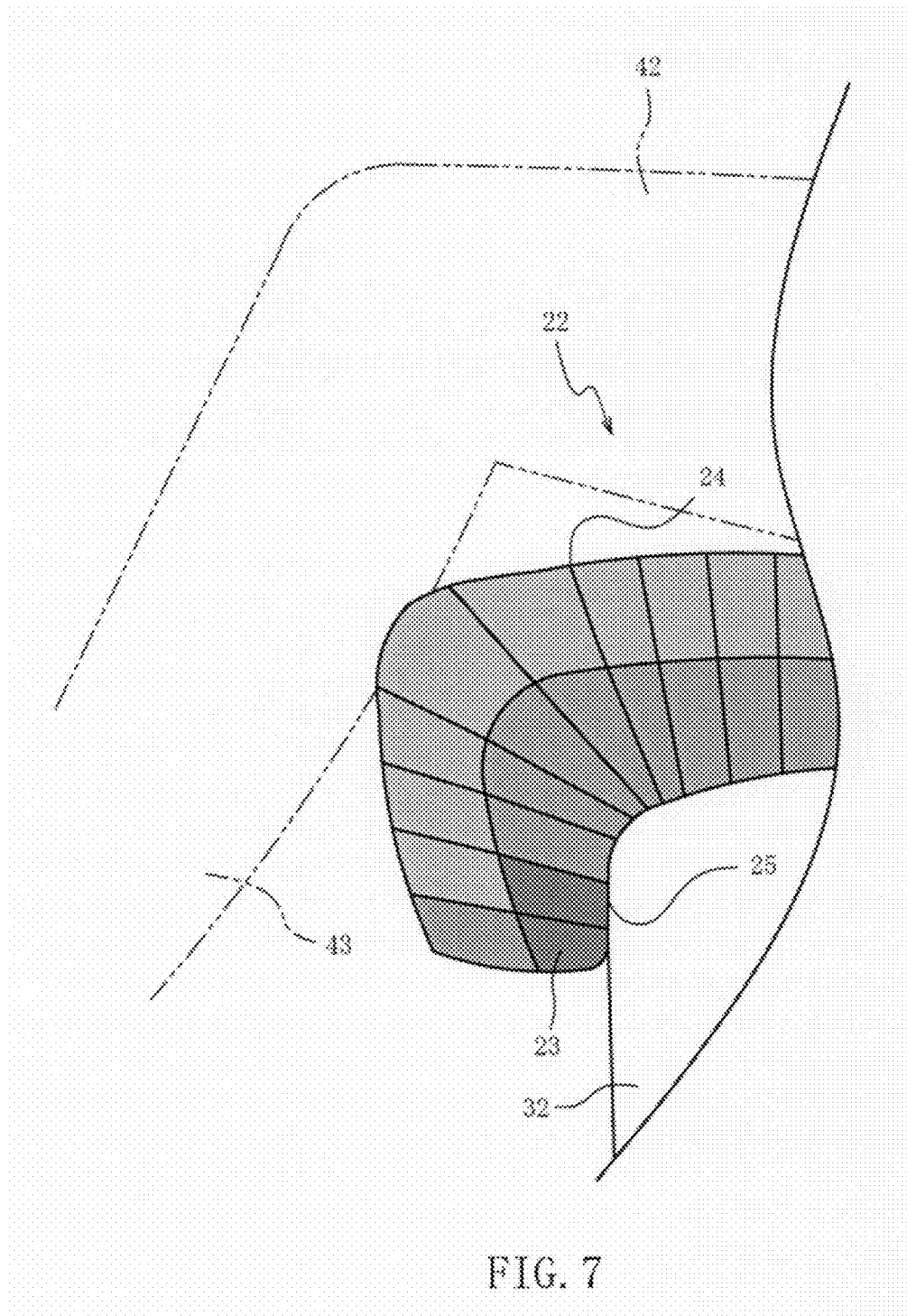
FIG. 7 is a partial cross-sectional view illustrating a partial cross section of the thigh supporting portion.

The following describes the hardness distribution of the thigh supporting portion 22 with reference to FIG. 6 and FIG. 7. FIG. 6 is a partial cross-sectional view of the cushion pad 20 illustrating a partial cross section of the thigh supporting portion 22 before bending (before being installed on the seat frame 32). FIG. 7 is a partial cross-sectional view illustrating a partial cross section of the thigh supporting portion 22 (after being installed on the seat frame 32). Note that, in FIG. 6, the illustration of the under-buttock portion 21 is omitted.

In this embodiment, the thigh supporting portion 22 is equally sectionalized into two layers (20 mm for each thickness) from the seating surface 24 toward the bottom surface 25. Those layers in the front-rear direction (the right-left direction in FIG. 6) are equally sectionalized into 10 pieces (20 mm for each length). In the respective layers, the widths in the width direction (the perpendicular direction on the paper in FIG. 6) are set to 20 mm to sample the test pieces in a quadrangular prism shape (cube) having 20 mm for each side. For the sampled test piece, the force during compression to 25% is measured in compliance with E method specified in JIS K6400-2 (the 2012 edition) described above. The sampled test piece including the bottom surface 25 is placed on a support plate (not shown) side while facing the bottom surface 25 side after a reinforced fabric (not shown) is removed. Then, the hardness is measured.

In FIG. 6, the values (unit: $N/cm^2$) obtained by dividing the hardnesses (unit: N) of the respective test pieces by the cross-sectional areas (unit: $cm^2$) of the test pieces are divided into sections (identical to the sections in FIG. 3). These sections are displayed by shadings corresponding to the sampling positions of the test pieces. Similarly to FIG. 3, FIG. 6 illustrates the state where a darker color indicates a larger hardness. As illustrated in FIG. 6, the thigh supporting portion 22 is formed to have a smaller hardness on the seating surface 24 side than that on the bottom surface 25 side while having a larger hardness on the end portion (the left end in FIG. 6) side than that on the under-buttock portion 21 side (the right side in FIG. 6).

As illustrated in FIG. 7, the thigh supporting portion 22 is installed on the seat frame 32 (see FIG. 1) while the forward end portion 23 is bent. As a result, the seating surface 24 having a hardness smaller than that on the bottom surface 25 side faces the thigh 42 and the lower thigh (calf) 43. By bending the forward end portion 23, the end portion (the lower portion in FIG. 7) of the thigh supporting portion 22 having a large hardness is arranged downward. The thigh supporting portion 22 allows the seating surface 24, which faces the thigh 42 and the lower thigh 43, to provide a soft feeling. This consequently allows reducing the oppressive feeling of the thigh 42. Additionally, the end portion having a large hardness becomes less likely to be in contact with the thigh 42 and the lower thigh 43. This allows providing less uncomfortable feeling to the seated person 40. Furthermore, this allows supporting the thigh 42 while preventing the situation where the thigh 42 becomes difficult to move in the above-below direction in the case where the seated person 40 operates an accelerator pedal or a brake pedal. This allows reducing the accumulation of fatigue due to a pedal operation.

The following describes the foamable raw liquid (the compound liquid containing the polyol component, the polyisocyanate component, the foaming agent, and the catalyst) for molding the cushion pad 20.

The polyol component can employ polyetherpolyol, polyester polyol, polycarbonate polyol, polyolefin polyol, and lactone-based polyol. One kind or the mixture of two or more kinds of these components can be used. Among these, polyetherpolyol is preferred because the raw material cost is low and the water resistance is excellent.

As necessary, polymer polyol can be used in combination. Polymer polyol employs, for example, material obtained by graft-copolymerizing a polymer component such as polyacrylonitrile and acrylonitrile-styrene copolymer to polyetherpolyol containing polyalkylene oxide.

The weight average molecular weight of the polyol component is preferred to be 6000 to 10000. In the case where the weight average molecular weight is less than 6000, the flexibility of the obtained foam is lost such that degradation in physical property or a decrease in elastic performance is likely to occur. In the case where the weight average molecular weight exceeds 10000, the hardness of the foam is likely to decrease.

The polyisocyanate component can employ publicly-known various polyfunctional aliphatic, alicyclic, and aromatic isocyanates. For example, tolylene diisocyanate (TDI), methylene diphenyl diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, ortho-toluidine diisocyanate, naphthylene diisocyanate, xylylene diisocyanate, lysine diisocyanate, and similar component can be employed. Among these, one kind may be used alone or two or more kinds may be used in combination.

MDI-based isocyanates typified by methylene diphenyl diisocyanate include, for example, methylene diphenyl diisocyanate (pure MDI), polyphenylene polymethylene polyisocyanate (polymeric MDI), polymeric body of these, urethane-modified body of these, urea-modified body, allophanate-modified body, biuret modified body, carbodiimide-modified body, uretonimine-modified body, uretdione-modified body, isocyanurate-modified body, and the mixture of two or more kinds of these.

Furthermore, terminal isocyanate prepolymer can also be used. Terminal isocyanate prepolymer is obtained by preliminarily causing a reaction of: polyol such as polyetherpolyol and polyester polyol; and polyisocyanate (such as TDI-based isocyanate and MDI-based isocyanate). Use of terminal isocyanate prepolymer allows controlling the viscosity of the compound liquid (foamable raw liquid), the primary structure of polymer, the compatibility, and it is preferable.

In this embodiment, the polyisocyanate component preferably employs MDI-based isocyanate, which allows molding an elastic foam having a small rebound resilience compared with the elastic foam by TDI-based isocyanate. In the case where the mixture of MDI-based isocyanate and TDI-based isocyanate is used, the mass ratio is set to MDI-based material:TDI-based material=100:0 to 75:25, preferably, 100:0 to 80:20. As the mass ratio of the TDI-based material in the polyisocyanate component becomes larger than 20/100, the wobbling feeling in the obtained product tends to decrease. When the mass ratio of the TDI-based material becomes larger than 25/100, this trend becomes remarkable. It is to be noted that, the isocyanate index (the percentage of the equivalence ratio of the isocyanate group to the active hydrogen group) of the polyisocyanate component is set to, for example, 85 to 130.

The foaming agent mainly employs water. As necessary, molding can also be performed by concomitantly using a small amount of a low boiling point organic compound such as cyclopentane, normal pentane, isopentane, and HFC-245fa or using a gas loading device so as to mix and dissolve air, nitrogen gas, liquefied carbon dioxide, or similar material in the raw liquid. The preferred addition amount of the foaming agent depends on the set density of the obtained product, but is normally 0.5 to 15 mass % with respect to the polyol component.

The catalyst can employ various urethane catalysts that are publicly-known in this field. For example, reactive amine such as triethylamine, tripropylamine, tributylamine, N-methylmorphiline, N-ethylmorpholine, dimethylbenzylamine, N,N,N',N'-tetramethylhexamethylenediamine, N,N,N',N',N''-pentamethyldiethylenetriamine, and bis-(2-dimethylaminoethyl) ether, or organic acid salt of these; metal carboxylate such as potassium acetate and potassium octoate, or an organic metal compound such as stannous octoate, dibutyl tin dilaurate, and zinc naphthenate can be employed. Furthermore, an amine catalyst having an active hydrogen group such as N,N-dimethylethanolamine and N,N-diethylethanolamine is also preferred. The preferred addition amount of the catalyst is 0.01 to 10 mass % with respect to the polyol component.

As necessary, a polyvalent active hydrogen compound having a low molecular weight is used as a crosslinking agent. The crosslinking agent facilitates the adjustment of the spring property of the cushion pad. The crosslinking agent employs, for example: polyhydric alcohols such as ethylene glycol, propylene glycol, 1,4-butanediol, trimethylolpropane, and glycerin; a compound obtained by polymerizing ethylene oxide or propylene oxide using these polyhydric alcohols as an initiator; and alkanolamines such as monoethanolamine, diethanolamine, triethanolamine, and N-methyldiethanolamine. These compounds can be used alone or as the mixture of two or more kinds.

Furthermore, a foam stabilizer is used as necessary. The foam stabilizer can employ an organic silicon-based surfactant that is publicly-known in this field. The preferred addition amount of the foam stabilizer is 0.1 to 10 mass % with respect to the polyol component. Further, as necessary, a flame retardant, a plasticizer, a cell opener, an oxidation inhibitor, an ultraviolet absorber, a colorant, various fillers, an internal mold release agent, or other process aids are used.

The following describes the present invention for more details using Examples. However, the present invention is not limited to these Examples. The compositions of the compound liquid (foamable raw liquid) for molding the cushion pad in Examples and Comparative examples are shown in Table 1 and Table 2. The numerical value of the compositions shown in Table 1 and Table 2 denotes the unit mass (mass ratio). Furthermore, the isocyanate amount in Table 1 and Table 2 is the mass ratio of isocyanate to polyol (to 100 of polyol). Isocyanates 1 to 3 are the component ratios to the entire isocyanate.

TABLE 1

|  |  | Example 1 | Example 2 | Example 3 | Example 4 | Comparative example 1 | Comparative example 2 | Comparative example 3 |
|---|---|---|---|---|---|---|---|---|
| polyol | 1 | 80 | 80 | 80 | 80 |  |  |  |
|  | 2 |  |  |  |  | 60 | 60 | 60 |
|  | 3 | 20 | 20 | 20 | 20 | 40 | 40 | 40 |
| crosslinking agent | 1 | 1.0 | 1.0 | 1.0 | 1.0 | 1.5 | 1.5 | 1.5 |
|  | 2 |  |  |  |  | 2.5 | 2.5 | 2.5 |
| cell opener |  | 2.0 | 2.0 | 2.0 | 2.0 |  |  |  |
| foam stabilizer | 1 | 1.0 | 1.0 | 1.0 | 1.0 |  |  |  |
|  | 2 |  |  |  |  | 1.0 | 1.0 | 1.0 |
| catalyst | 1 | 0.45 | 0.45 | 0.45 | 0.45 | 0.40 | 0.40 | 0.40 |
|  | 2 | 0.05 | 0.05 | 0.05 | 0.05 | 0.05 | 0.05 | 0.05 |
| water |  | 2.9 | 2.9 | 2.9 | 2.9 | 2.5 | 2.5 | 2.5 |
| isocyanate amount |  | 49.9 | 49.9 | 49.9 | 49.9 | 37.1 | 38.1 | 35.6 |
| isocyanate | 1 |  | 5 | 15 | 25 | 80 | 70 | 60 |
|  | 2 | 100 | 95 | 85 | 75 |  |  |  |
|  | 3 |  |  |  |  | 20 | 30 | 40 |
| hardness (25% ILD) |  | 237 | 243 | 254 | 262 | 257 | 233 | 204 |
| pedal operability |  | Good | Good | Good | Fair | Poor | Fair | Good |
| feeling of under-buttock sinking |  | Good | Good | Good | Good | Good | Good | Poor |

TABLE 2

|  |  | Example 5 | Example 6 |
|---|---|---|---|
| polyol | 1 | 80 | 80 |
|  | 2 |  |  |
|  | 3 | 20 | 20 |
| crosslinking agent | 1 | 1.0 | 1.0 |
|  | 2 |  |  |
| cell opener |  | 2.0 | 2.0 |
| foam stabilizer | 1 | 1.0 | 1.0 |
|  | 2 |  |  |
| catalyst | 1 | 0.45 | 0.45 |
|  | 2 | 0.05 | 0.05 |
| water |  | 2.9 | 2.9 |
| isocyanate amount |  | 49.9 | 49.9 |
| isocyanate | 1 |  | 25 |
|  | 2 | 100 | 75 |
|  | 3 |  |  |
| hardness (25% ILD) |  | 237 | 262 |
| pedal operability |  | Excellent | Good |
| feeling of under-buttock sinking |  | Good | Good |

Furthermore, the respective components described on Table 1 and Table 2 are as follows.
polyol 1: polyetherpolyol EP828 (made by Mitsui Chemicals, Inc.), weight average molecular weight 6000
polyol 2: polyetherpolyol EP330N (made by Mitsui Chemicals, Inc.), weight average molecular weight 5000
polyol 3: polymer polyol POP3623 (made by Mitsui Chemicals, Inc.)
crosslinking agent 1: diethanolamine
crosslinking agent 2: EL980 (made by ASAHI GLASS CO., LTD.)
cell opener: EP505S (made by Mitsui Chemicals, Inc.)
foam stabilizer 1: SZ1336 (made by Dow Corning Toray Co., Ltd.)
foam stabilizer 2: SZ1325 (made by Dow Corning Toray Co., Ltd.)
catalyst 1: TEDA L33 (made by TOSOH CORPORATION)
catalyst 2: ToyocatET (made by TOSOH CORPORATION)
isocyanate 1: tolylene diisocyanate TDI-80 (made by Mitsui Chemicals, Inc.)
isocyanate 2: polymeric MDI 2,4'-MDI.4,4'-mixture of MDI
isocyanate 3: polymeric MDI MR200 (made by Nippon Polyurethane Industry Co., Ltd. (TOSOH CORPORATION)))

Respective these components were combined by an ordinary method using the mass ratios shown in Table 1 and Table 2 so as to be uniformly mixed. Subsequently, a predetermined amount of the mixture was injected to the molding die (the lower die) for a cushion pad in a predetermined shape and was foamed and hardened inside the cavity so as to obtain cushion pads in Examples 1 to 6 and Comparative examples 1 to 3.

Figure 8:
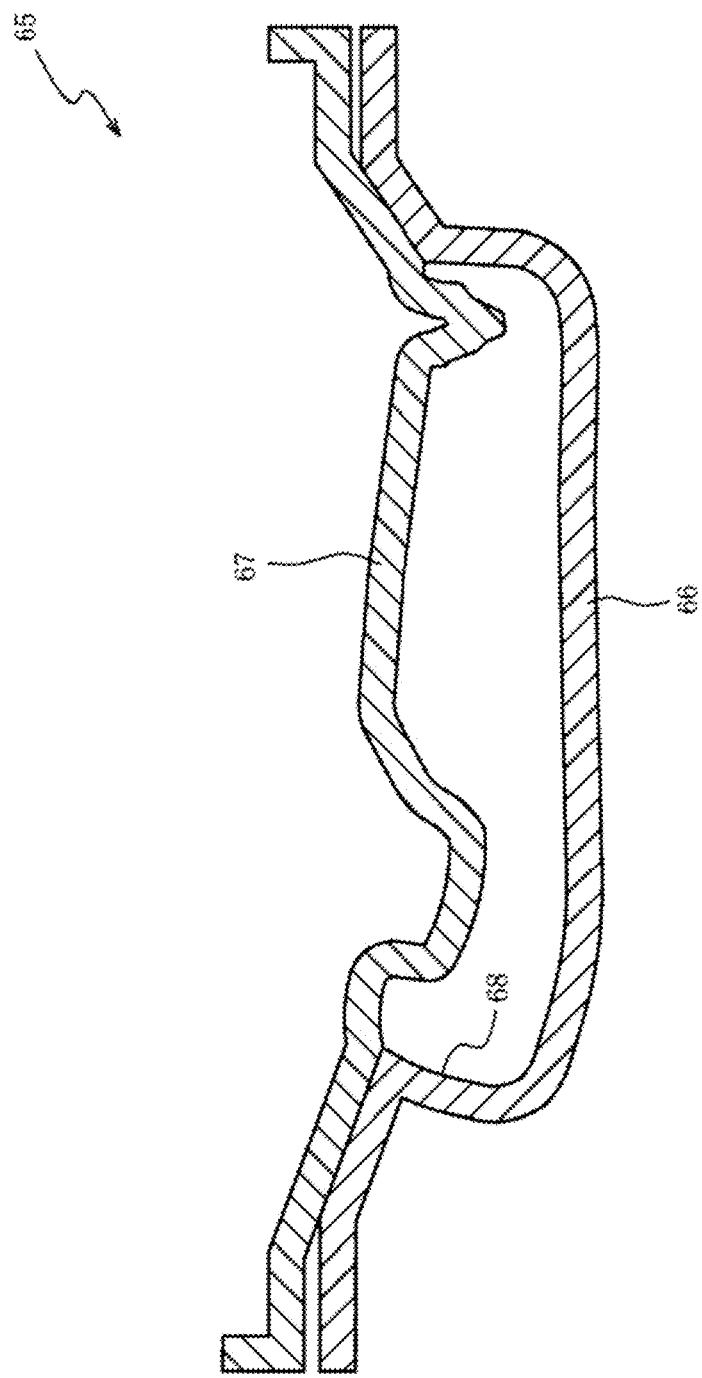
FIG. 8 is a cross-sectional view of a molding die for molding the cushion pad.

Note that, Examples 1 to 4 and Comparative examples 1 to 3 shown in Table 1 were molded using a molding die 65 illustrated in FIG. 8. Examples 5 and 6 shown in Table 2 were molded using the molding die 60 illustrated in FIG. 5. FIG. 8 is a cross-sectional view of the molding die 65 for molding the cushion pads in Examples 1 to 4 and Comparative examples 1 to 3. The molding die 65 includes a lower die 66 and an upper die 67 for forming a cavity, and includes a bent portion 68 for molding the forward end portion 23 of the thigh supporting portion 22 (see FIG. 1). The bent portion 68 is the portion for bending the end portion of the lower die 66 upward, and the upper die 67 is also bent upward in association with the bending of the lower die 66.

For all the cushion pads molded using the molding dies 60 and 65, based on D method specified in JIS K6400-2 (the 2012 edition), a force (unit: N) was obtained after 25% constant compression of the point on the under-buttock portion 21 corresponding to the hip point 44 using a pressure plate having a diameter of 200 mm (25% ILD). After the cushion pad is mounted on the seat frame 32 (see FIG. 1), an examinee was seated to carry out sensory tests, so as to evaluate pedal operability and a feeling of under-buttock sinking. The pedal operability evaluates the operability of the brake pedal and accelerator pedal, and has four levels of "Excellent: the support and the movement of the thigh are considerably excellent, Good: the movement of the thigh is excellent, Fair: the movement of the thigh is restricted a little, Poor: the thigh has an oppressive feeling." The feeling of under-buttock sinking evaluates the feeling of stability of the buttocks during seating, and has two levels of "Good: there is a feeling of stability, Poor: there is a feeling of sinking." The results of these are shown in Table 1 and Table 2.

Furthermore, for the cushion pad in Example 3, the under-buttock portion 21 was equally sectionalized to sample test pieces (in a quadrangular shape having the size of 20 mm in length, 20 mm in width, and 20 mm in height) (see FIG. 2). The force $S_{25}$ during compression to 25% was measured in compliance with E method specified in JIS K6400-2 (the 2012 edition). FIG. 3 and FIG. 4 are diagrams illustrating the hardness of the cushion pad in Example 3.

As shown in Table 1, for Examples 1 to 4, the evaluations of the feeling of under-buttock sinking were Good, and the evaluations of the pedal operability were Good and Fair. On the other hand, for Comparative example 1 whose hardness was approximately identical to those of Examples 3 and 4, the evaluation of the pedal operability was Poor. As illustrated in FIG. 3 and FIG. 4, in the cushion pad in Example 3, the seating surface 24 side is softer than the bottom surface 25 side. Accordingly, compared with Comparative example 1 having a similar hardness, the pedal operability was excellent.

As shown in Table 2, for Examples 5 and 6, compared with Examples 1 and 4 (see Table 1) molded using the respective identical foamable raw liquids, the evaluations of the pedal operability were high levels. Examples 1 and 4 are molded using the molding die 65 where the bent portion 68 is formed (see FIG. 8) while Examples 5 and 6 are molded using the molding die 60 (see FIG. 5). The molding die 60 differs from the molding die 65 in that the bent portion 68 (see FIG. 8) is not disposed. For Examples 5 and 6, after the cushion pad 20 (the thigh supporting portion 22) is molded using the molding die 60 (see FIG. 6), the forward end portion 23 is bent when the cushion pad 20 is mounted on the seat frame 32.

On the other hand, Examples 1 and 4 are manufactured in the state where the forward end portion 23 is bent using the bent portion 68 of the molding die 65. Molding in the state where the forward end portion 23 is bent inside the molding die 65 causes a large hardness of the seating surface 24 in the forward end portion 23 for Examples 1 and 4 compared with Examples 5 and 6. This is because, in Examples 1 to 6, the cushion pad molded using a foamable raw liquid has a property where the bottom surface 25 side is harder than the seating surface 24 side and the peripheral area is harder than the center on the bottom surface 25 side. Accordingly, molding the forward end portion 23 using the bent portion 68 of the molding die 65 (in Examples 1 and 4) causes an increase in hardness on the seating surface 24 side of the forward end portion 23 so as to deteriorate the pedal operability compared with the cushion pad (in Examples 5 and 6) using the molding die 60. In contrast, according to Examples 5 and 6 molded using the molding die 60, the forward end portion 23 is made by being bent after molding. This allows ensuring softness on the seating surface 24 side of the forward end portion 23, so as to improve the pedal operability.

Figure 9:
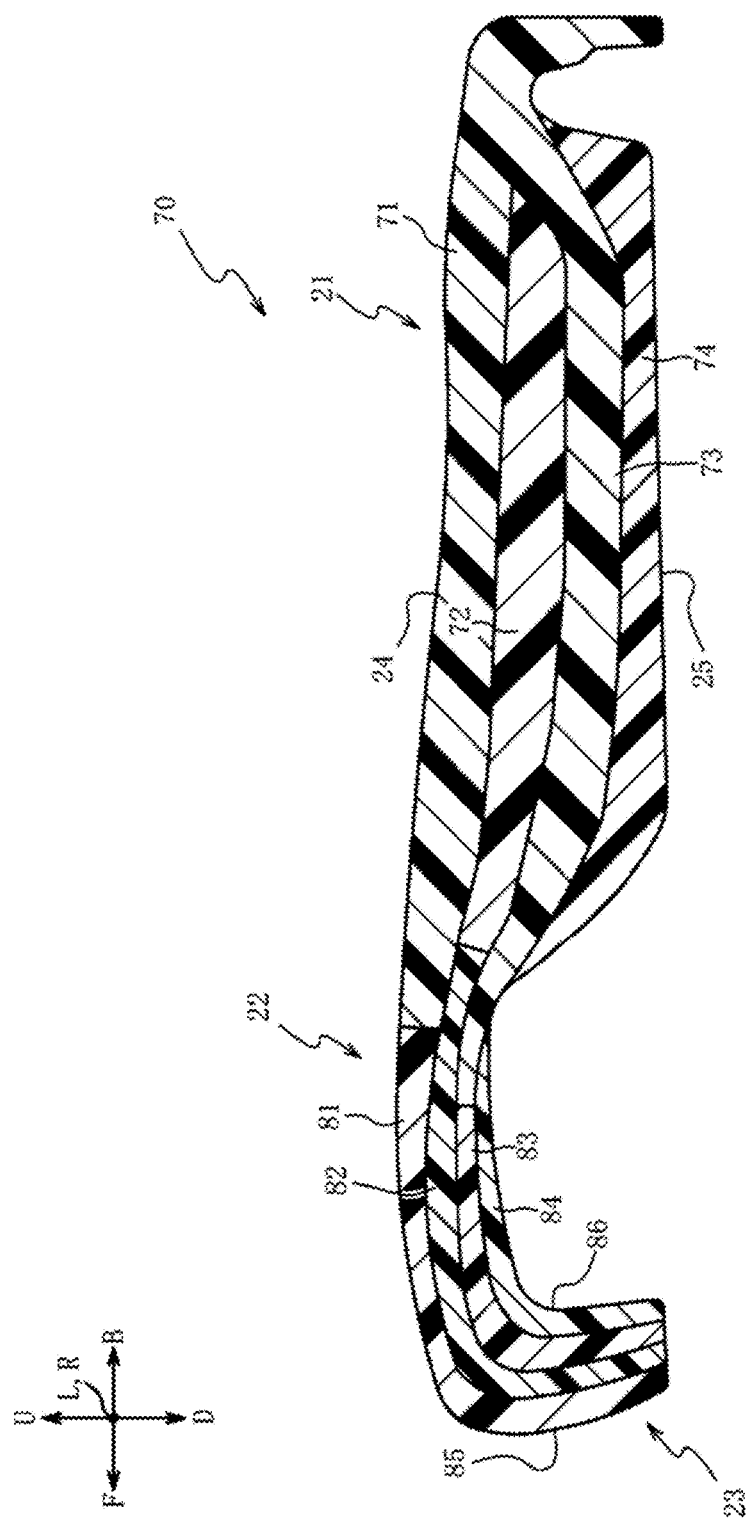
FIG. 9 is a cross-sectional view of a cushion pad according to a second embodiment.

Referring to FIG. 9, the following describes a second embodiment. In the first embodiment, the cushion pad integrally formed with the flexible polyurethane foam has been described. In contrast, in the second embodiment, a description will be given of a cushion pad formed by laminating a plurality of layered members. FIG. 9 is a cross-sectional view of a cushion pad 70 according to the second embodiment. Here, similarly to the first embodiment, the illustration of the side support portion facing the side surface of the seated person 40 is omitted.

As illustrated in FIG. 9 the cushion pad 70 includes the under-buttock portion 21 and the thigh supporting portion 22. The under-buttock portion 21 includes: a seating portion 71, which faces the seated person 40 (see FIG. 1); an upper center portion 72, which is arranged under the seating portion 71; a lower center portion 73, which is arranged under the upper center portion 72; and a bottom surface portion 74, which is arranged under the lower center portion 73. The seating portion 71, the upper center portion 72, the lower center portion 73, and the bottom surface portion 74 are bonded to one another to be laminated.

The thigh supporting portion 22 includes: a seating portion 81, which faces the seated person 40 (see FIG. 1); an upper center portion 82, which is arranged under the seating portion 81; a lower center portion 83, which is arranged under the upper center portion 82; and a bottom surface portion 84, which is arranged under the lower center portion 83. The seating portion 81, the upper center portion 82, the lower center portion 83, and the bottom surface portion 84 are bonded to one another to be laminated. The end portion side of the thigh supporting portion 22 is bent downward, so as to form the forward end portion 23. The shape of the thigh supporting portion 22 is held by covering a seating surface 85 and a bottom surface 86 with the surface skin (not shown) so as to restrain the forward end portion 23.

For the seating portions 71 and 81, the upper center portions 72 and 82, the lower center portions 73 and 83, and the bottom surface portions 74 and 84, the respective materials are selected such that the force $S_{25}$ during compression to 25% increases in this order. In this embodiment, the seating portions 71 and 81, the upper center portions 72 and 82, the lower center portions 73 and 73, and the bottom surface portions 74 and 84 are all formed in a tabular shape using flexible polyurethane foam (molded urethane). The hardness distributions of the seating portions 71 and 81, the upper center portions 72 and 82, the lower center portions 73 and 83, and the bottom surface portions 74 and 84 are set similarly to the hardness distributions in the cushion pad 20 according to the first embodiment. Therefore, the description of these is omitted. The cushion pad 70 in the second embodiment allows achieving the operation and effect similar to those of the cushion pad 20 in the first embodiment.

As described above, the present invention has been described based on the above-mentioned embodiments. It will be appreciated that the present invention will not be limited to the embodiments described above, but various modifications are possible without departing from the technical scope of the present invention. For example, the shapes described in the above-mentioned embodiments are examples. Other shapes are obviously possible.

While in the above-described respective embodiments the cushion pads 20 and 70 to be mounted on a vehicle (automobile) have been described, this should not necessarily be construed in a limiting sense. The cushion pads 20 and 70 may obviously be applied to a cushion material equipped with another transportation means such as a vehicle (such as a railway vehicle), a ship, and an aircraft other than the automobile or applied to a cushion material of furniture or similar product.

While in the above-described first embodiment, for convenience, a description has been given of the case where the integrally molded cushion pad 20 (the under-buttock portion 21) made of foamed synthetic resin (made of flexible polyurethane foam) is sectionalized into four layers in the above-below direction, the respective layers are sectionalized into 15 pieces in the right-left direction, and test pieces are sampled to measure the hardness, the number (the number of layers or the number of sections in the right-left direction) and the size of the test pieces are not limited to these. The size of the test piece can be set to a size that allows measurement of the hardness as necessary. Furthermore, taking into consideration the size of the test piece to allow measurement of the hardness, the number of the test pieces can be set to the number that allows sampling of the test piece having this size as necessary. It is to be noted that, taking into consideration the size the cushion pad 20, it is appropriate to sectionalize the under-buttock portion 21 into four layers or five layers. Furthermore, the size of the test piece is preferred to have 20 to 25 mm in length for each side of the quadrangular prism. The same applies to the test pieces sampled from the thigh supporting portion 22.

Furthermore, in the above-described first embodiment, for convenience, a description has been given of the case where the first portion 55, the third portion 57, and the fourth portion 58 are disposed in the lower center portion 53. However, the positions of the first portion 55, the third portion 57, and the fourth portion 58 are not limited to these. These positions can be set corresponding to the number of layers to sectionalize the cushion pad 20 (the under-buttock portion 21) in the above-below direction as necessary.

While in the above-described respective embodiments a description has been given of the case where the side support portions (not shown) are disposed in the cushion pads 20 and 70, this should not necessarily be construed in a limiting sense. The side support portions can be omitted.

While in the above-described second embodiment a description has been given of the case where the seating portions 71 and 81, the upper center portions 72 and 82, the lower center portions 73 and 83, and the bottom surface portions 74 and 84 are all formed with the flexible polyurethane foam (molded urethane) molded by the molding die in a predetermined shape, this should not necessarily be construed in a limiting sense. It is obviously possible to employ other materials. The other materials include, for example, slab urethane formed by cutting off the molded flexible polyurethane foam, chip urethane formed by crushing the listing and similar material generated in the manufacturing process of the flexible polyurethane foam, a three dimensional net-like body constituted of a plurality of three-dimensionally intertwined fibers made of synthetic resin, a fiber body such as solid cotton, a synthetic resin-made elastic body such as urethane rubber and thermoplastic elastomer. Laminating these materials allows obtaining a predetermined hardness distribution. The hardnesses, the densities, and the shapes of the seating portions 71 and 81, the upper center portions 72 and 82, the lower center portions 73 and 83, and the bottom surface portions 74 and 84 are set as necessary by, for example, selecting materials, designing the cavity shape of the molding die, cutting, and machining.

The invention claimed is:
1. A cushion pad, comprising:
an under-buttock portion that is adapted to support a buttocks of a seated person; and
a thigh supporting portion that is positioned forward of the under-buttock portion and that is adapted to support a thigh of the seated person, wherein
the under-buttock portion and the thigh supporting portion have seating surfaces adapted to face the seated person and bottom surfaces on an opposite side to the seating surfaces,
in a portion of the under-buttock portion adapted to be positioned underneath a hip point of the seated person, the under-buttock portion is set to have a smaller hardness at a second portion including the seating surface than a hardness of a first portion on the bottom surface side of a thickness center, the thickness center being a center sandwiched between the seating surface and the bottom surface in the thickness direction,
the thigh supporting portion is set to have a smaller hardness at a portion including the seating surface than the hardness of the first portion,
the hardness is a force during compression to 25% measured using a quadratic-prism-shaped test piece sampled by equally dividing the under-buttock portion and the thigh supporting portion,
the under-buttock portion includes in a vertical direction from the seating surface to the bottom surface, equally sectionalized layers including a seating portion layer, an upper center portion layer, a lower center portion layer, and a bottom surface portion layer, a hardness increasing in the vertical direction in the order corresponding to the seating portion layer, the upper center portion layer, the lower center portion layer, and the bottom surface portion layer, and a hardness increasing in the upper center portion layer and the lower center portion layer from a center of each layer to outer sides of each layer.
2. The cushion pad according to claim 1, wherein
the under-buttock portion is set to have a larger hardness of a third portion than the hardness of the first portion, the third portion having a depth identical to a depth of the first portion from the seating surface, the third portion being adapted to be positioned rearward of the hip point.
3. The cushion pad according to claim 1, wherein
the under-buttock portion is set to have a larger hardness of a fourth portion than the hardness of the first portion, the fourth portion having a depth identical to a depth of the first portion from the seating surface, the fourth portion being adapted to be positioned forward of the hip point.
4. The cushion pad according to claim 1, wherein
the thigh supporting portion is set to have a larger hardness of a portion on the bottom surface side than the hardness of the portion including the seating surface.
5. The cushion pad according to claim 1, wherein
the thigh supporting portion includes a forward end portion where the seating surface is adapted to face a lower thigh of the seated person, and
the forward end portion is set to have a larger hardness of a portion on the bottom surface side than a hardness of a portion including the seating surface.
6. The cushion pad according to claim 5, wherein
the under-buttock portion and the thigh supporting portion are integrally molded by a single foamed synthetic resin material, and
the forward end portion is formed by being bent after the under-buttock portion and the thigh supporting portion are molded.
7. The cushion pad according to claim 4, wherein
the thigh supporting portion includes a forward end portion where the seating surface is adapted to face a lower thigh of the seated person, and
the forward end portion is set to have a larger hardness of a portion on the bottom surface side than a hardness of a portion including the seating surface.

8. A cushion pad, comprising:

an under-buttock portion for supporting a buttocks of a seated person; and a thigh supporting portion that is positioned forward of the under-buttock portion for supporting a thigh of the seated person, wherein the under-buttock portion and the thigh supporting portion have seating surfaces for facing the seated person and bottom surfaces on an opposite side to the seating surfaces, in a portion of the under-buttock portion to be positioned underneath a hip point of the seated person, the under-buttock portion is set to have a smaller hardness at a second portion including the seating surface than a hardness of a first portion on the bottom surface side of a thickness center, the thickness center being a center sandwiched between the seating surface and the bottom surface in the thickness direction, the thigh supporting portion is set to have a smaller hardness at a portion including the seating surface than the hardness of the first portion, the hardness is a force during compression to 25% measured using a quadratic-prism-shaped test piece sampled by equally dividing the under-buttock portion and the thigh supporting portion, the under-buttock portion includes in a vertical direction from the seating surface to the bottom surface, equally sectionalized layers including a seating portion layer, an upper center portion layer, a lower center portion layer, and a bottom surface portion layer, a hardness increasing in the vertical direction in the order corresponding to the seating portion layer, the upper center portion layer, the lower center portion layer, and the bottom surface portion layer, and a hardness increasing in the upper center portion layer and the lower center portion layer from a center of each layer to outer sides of each layer.

* * * * *